Figure 1:
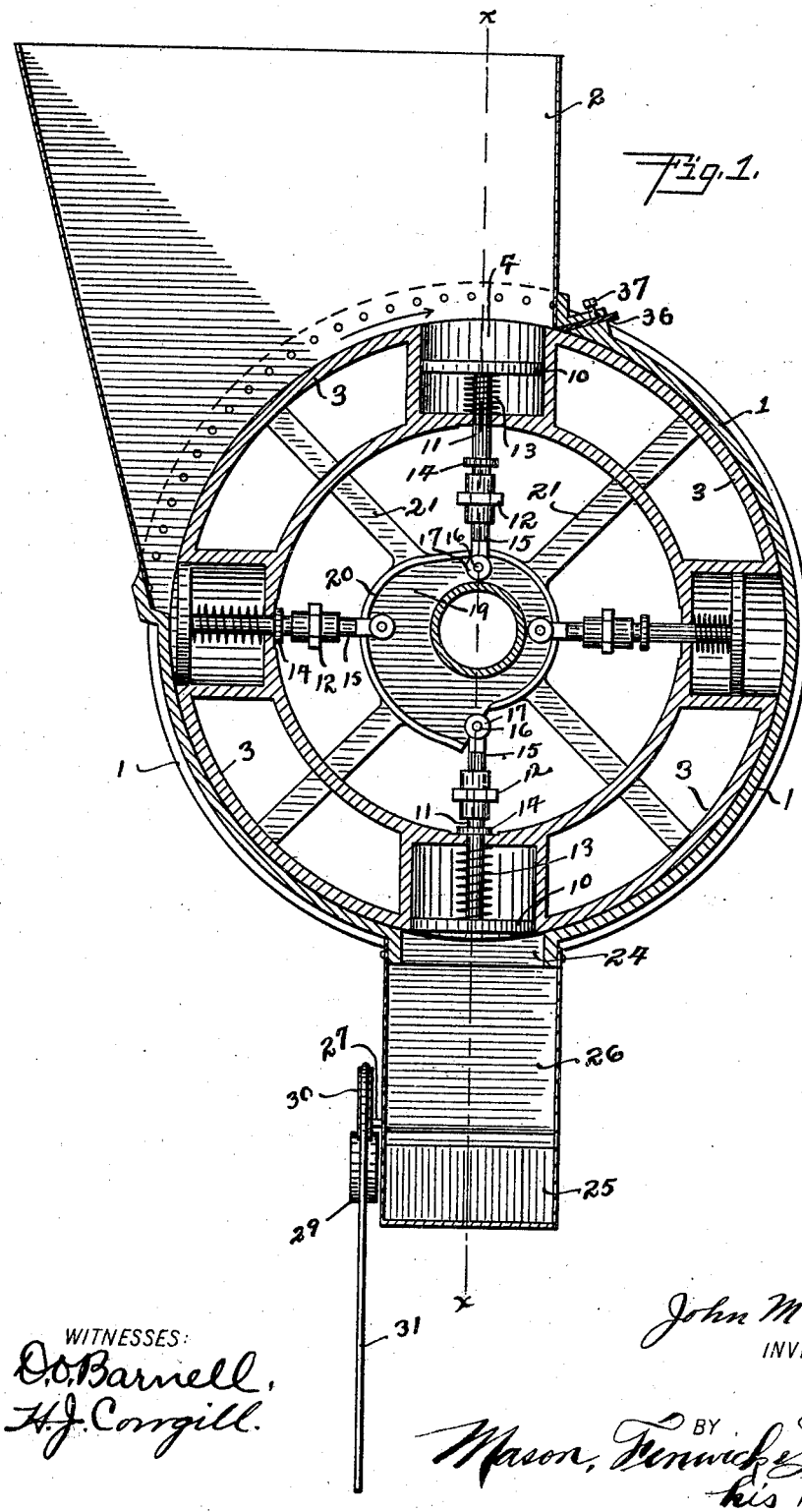

No. 709,793. Patented Sept. 23, 1902.
J. McGINNITY.
MEASURING AND DISCHARGING APPARATUS FOR FILLING CANS.
(Application filed Dec. 31, 1901.)
(No Model.) 2 Sheets—Sheet 1.

WITNESSES:
O.C.Barnell.
H.J.Cowgill.

John McGinnity
INVENTOR

BY
Mason, Fenwick & Lawrence,
his ATTORNEYS.

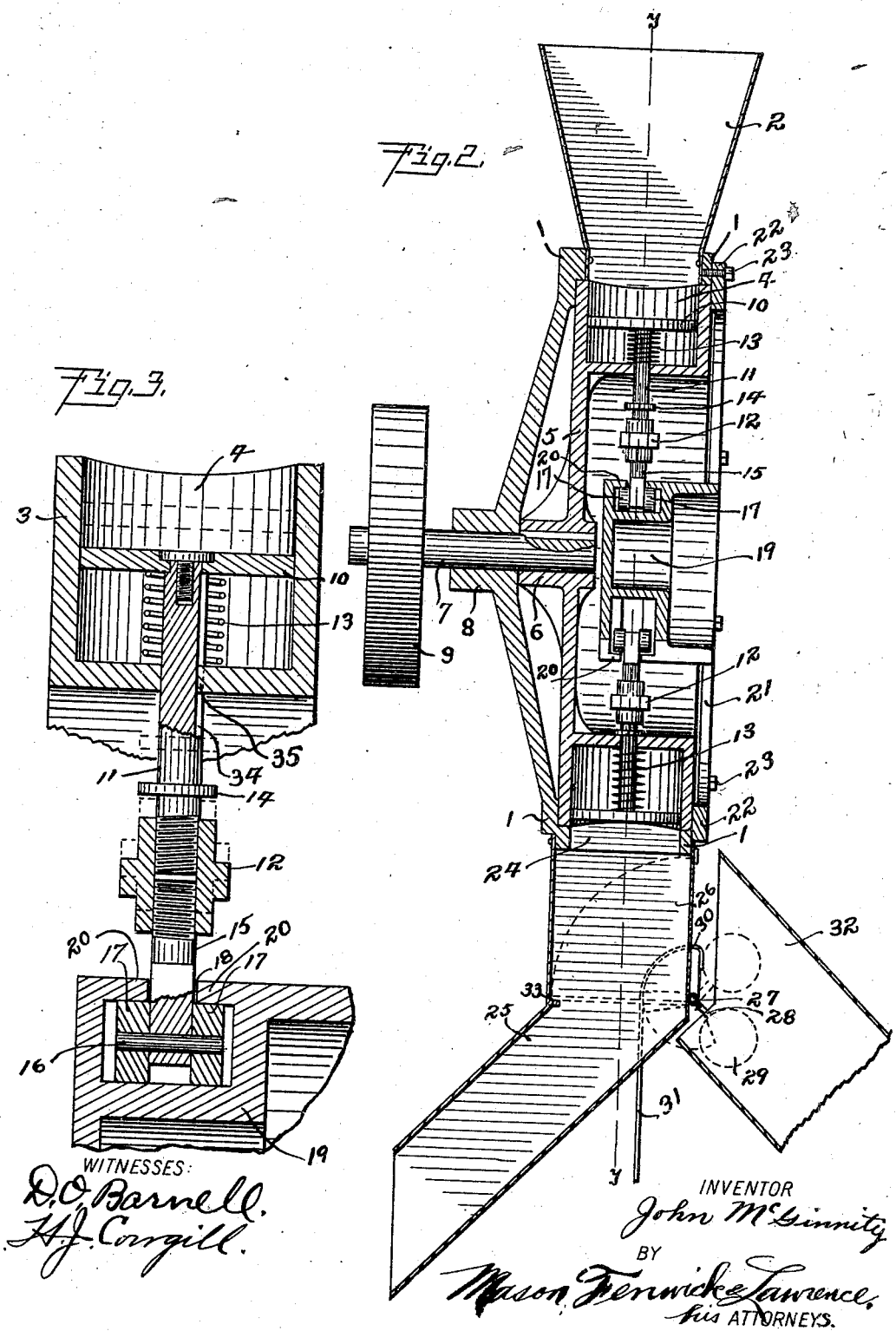

United States Patent Office.

JOHN McGINNITY, OF SOUTH OMAHA, NEBRASKA.

MEASURING AND DISCHARGING APPARATUS FOR FILLING CANS.

SPECIFICATION forming part of Letters Patent No. 709,793, dated September 23, 1902.

Application filed December 31, 1901. Serial No. 87,905. (No model.)

*To all whom it may concern:*

Be it known that I, JOHN MCGINNITY, a citizen of the United States, residing at South Omaha, in the county of Douglas and State of Nebraska, have invented certain new and useful Improvements in Measuring and Discharging Apparatus for Filling Cans; and I do hereby declare the following to be a full, clear, and exact description of the invention, such as will enable others skilled in the art to which it appertains to make and use the same.

This invention relates to improvements in measuring apparatus, and more particularly to such as are designed to be employed in conjunction with suitable can-filling means.

The object in view is to provide mechanism for separating predetermined quantities of material from a mass and for discharging said measured quantities into any stuffing-machine now in use for can-filling purposes.

A further object is the provision of such mechanism designed for measuring predetermined quantities of plastic semisolid substances, such as chopped meat, and means for altering the containing capacity of the measuring-receptacle for varying the quantities measured.

With these and other objects in view the invention consists, in combination with a suitable casing, of pockets movable within said casing and designed to be brought successively into register with a feeding-aperture therein, means for bringing said pockets into register with a discharge-chute, and means forcing out the material within said pockets at the time of registering with said discharge.

It also consists, in combination with a suitable casing, of pockets movable within said casing and designed to be brought successively into register with a feeding-aperture therein, means for bringing said pockets into register with a discharge-chute, means for forcing out the material within said pockets at the time of registering with said discharge.

It further consists in certain other novel constructions, combinations, and arrangements of parts, as will hereinafter be fully described and claimed.

In the accompanying drawings, Figure 1 represents a vertical sectional view of the machine, taken on the plane indicated by the line $y\ y$ of Fig. 2. Fig. 2 represents a similar view taken on the plane indicated by the line X X of Fig. 1. Fig. 3 represents a detail view of one of the plungers, showing the means for operating the same and for altering the containing capacity of its inclosing pocket.

In the construction shown I employ a suitable casing 1, preferably of cylindrical form and having an opening in its upper portion, to which is attached a chute or hopper 2, which is kept filled with the meat or other substances to be canned. Fitting snugly within the casing 1 is a second cylindrical body 3, which has in its outer face a number of radially-extending recesses or pockets 4, which are open at their outer ends and closed at the inner ends.

The body 3 has a number of arms or spokes 5 extending to a central hub 6, to which is attached a shaft 7. The shaft 7 passes through a second hub 8, which is formed as a part of the casing 1. On the outer end of said shaft is placed a driving-pulley 9 or other suitable means, whereby the shaft and body 3 may be rotated.

Within the pockets 4 are plungers 10, secured to shafts 11, which pass through the bottom of the said pockets and screw into the elongated nuts 12. Between the plungers 10 and the bottoms of the pockets are springs 13, coiled around the shafts 11, which normally press said plungers outward toward the surface of the body 3. This outward movement caused by said springs is limited by collars 14 on the inner ends of the shafts 11, so that the plungers cannot travel beyond the outer edge of the body 3.

The nuts 12 are formed with internal right and left hand threads, as clearly seen in Fig. 3, and into their inner ends are screwed the shafts 15. The inner ends of said shafts are square in section and have pins 16 passing through the same, on the ends of which are mounted rollers 17.

The squared ends of the shafts 15 pass through a slot 18, formed in a cam-body 19, and the rollers 17 engage the inner faces of the overhanging edges 20 of said cam-body.

The cam-body 19 is supported approximately centrally of the body 3 by arms 21, which extend to an annular ring 22, which is secured to the casing 1 by bolts 23.

At the lower part of the casing 1 is an opening 24, to which is secured the chute 25, extending to any suitable stuffing-machine. In one side of this chute 25 is a door 26, pivotally secured by a small shaft 27 to suitable bearings. On one end of the shaft 27 is an arm 28, carrying a weight 29, which normally holds the door 26 in a vertical or closed position. Also secured to the shaft 27 is a fan-shaped segment 30, having a cord 31 passing around the circumferential edge thereof. If at any time it is desired that the measure of material shall not pass through the chute 25 to the stuffing-machine, the operator thereof by pulling the cord 31 downward may turn the door 26 across the chute 25 until stopped by the projection 33 on the side of said chute, so the material will be caught by the said door, while on releasing the cord the door will be raised by the weight 29 and the measure of material will be dumped into a secondary chute 32, as best illustrated in Fig. 2.

In one side of each of the shafts 11 is a longitudinal groove 34, into which projects a tongue 35 at the point where said shaft passes through the bottom of the respective pocket 4, as shown in Fig. 3.

The cubic capacity of the pockets 4 may be varied by turning the nuts 12. The shaft 15 is prevented from turning by its squared end being in the slot 18, and the shaft 11 is prevented from turning by the groove and tongue 34 and 35. The turning of said nuts, into which said shafts are screwed with right and left hand threads, will vary the position of the plungers 10 in the pockets 4, as indicated in Fig. 3 in dotted lines.

The operation of the machine is as follows: The position of the plungers 10 is adjusted by the nuts 12, as described, so that the cubic capacity of the pockets 4 is that of the quantities of material which it is desired to have delivered. The hopper 2 is then filled with the material to be measured and the body 3 is rotated by the pulley 9 or other suitable means. As the pockets pass the hopper 2 the plungers 10 therein are drawn inward by the rollers 17 engaging the overhanging flanges 20 of the cam-body 19, so that the material in the hopper will be drawn into the pockets and fill the same. As the rotation is continued the material in the pockets will be separated from that remaining in the hopper by the edge of the knife 36, which is adjustably secured in contact with the surface of the body 3 by a set-screw 37. As the pockets reach the opening 24 in the lower part of the casing the rollers 17 slip off the cam-flanges 20, being propelled by the springs 13, and the contents of the pockets are discharged into the chute 25, and as the rotation continues the operation is repeated, as described.

It is obvious that the mechanism shown, while intended primarily as a feeder for the stuffing-machines now in use, may without material change be used for filling cans direct in cases where the consistence of the materials is sufficiently plastic as not to require positive crowding of the material into the cans, and although one specific embodiment of the present improvement has been shown and described in detail, yet I contemplate any desirable minor changes within the spirit and scope of the invention.

Having thus fully described my invention, what I claim as new, and desire to secure by Letters Patent, is—

1. A can-filling machine comprising a casing, a revolving member moving therein, having receptacles or pockets for receiving the material operated upon, plungers moving in said pockets and means for drawing the said plungers into position to permit material to enter the pockets, the said means releasing the plungers so they may eject the material from the said pockets, substantially as described.

2. A filling-machine made up of a casing, a rotating member moving within the same having a series of pockets formed therein, ejecting means moving in the said pockets and arranged to regulate the amount of material received in each pocket, and means for releasing the ejecting means to force material out at the delivery portion of the machine, substantially as described.

3. A filling-machine comprising a casing, a rotating member moving within the same having a series of pockets in its periphery, a plunger moving in each pocket, means for normally holding the plungers in their outermost positions, means for drawing the plungers inwardly a proper distance to permit each pocket to receive a suitable charge of the material to be handled, and means for releasing the said plungers quickly for forcibly ejecting material from the pockets at the discharge portion of the machine, substantially as described.

4. A machine for filling cans comprising a casing formed with a feed-hopper and a discharge-chute, a rotating member mounted within the casing and formed with pockets or recesses in its periphery, plungers movable in said pockets, springs for normally forcing the plungers outwardly, a cam adapted to engage the rods of each plunger for drawing the plungers inwardly to receive a charge of filling material, the said cam releasing the plungers suddenly opposite the discharge-chute so that the springs may force the plungers outwardly and discharge the filling into the said discharge-chute, substantially as described.

5. A can-filling machine comprising a casing, a rotating member operating therein provided with pockets in its periphery, a shaft extending into said casing from one side thereof for turning the rotating member, a cam projecting from said casing inwardly from the other side thereof, plungers moving in the pockets, plunger-rods extending from the plungers inwardly to the said cam and engaging the same, the cam operating to hold the plungers in proper position for the pockets to receive a charge of filling, the said cam releasing the plunger-rods opposite the discharge portion of the machine whereby the plungers may eject the filling, substantially as described.

6. In a mechanism of the class described, the combination with a suitable casing, of a body revolubly mounted therein, pockets formed in said body, a cam mounted centrally with respect to said body, a plunger operating in each of said pockets, means connecting said plunger with said cam, and devices carried by said connecting means for altering the containing capacity of each of said pockets, substantially as described.

7. In a mechanism of the class described, the combination with a suitable casing of a body revolubly mounted therein, pockets formed in said body, a cam mounted centrally with respect to said body, plungers operating within said pockets, shafts carried by said plunger and engaging said cam, means for increasing or decreasing the distance from said plunger to said cam, substantially as described.

8. In a mechanism of the class described, the combination with a suitable casing of a body revolubly mounted therein, pockets formed in said body, spring-pressed plungers mounted within said pockets, a cam fixedly supported by said casing, shafts carried by said plungers engaging said cam, a means for altering the distance from said plungers to said cam, substantially as described.

9. A filling-machine comprising a casing, a rotating member moving therein having a series of pockets in its periphery, plungers moving in said pockets, a cam in the central portion of the casing provided with a groove in its periphery, antifriction-rollers carried by the plunger-stems engaging the overhanging flanges of the cam-groove, the said cam-groove having an opening at one portion and being shaped so as to lead the rollers inwardly for a distance and then suddenly release them so that the plungers may be forced outwardly at this point after which the rollers will be again caught by the flanges of the said groove and means for forcing the plungers outwardly, substantially as described.

10. In a mechanism of the class described, the combination with a suitable casing of a cam-body carried thereby and provided with slots produced by overhanging flanges, containing-receptacles mounted within said casing and designed to be passed about said cambody, plungers operable within said receptacles, shafts carried by said plungers, antifriction means carried by the inner ends of said shafts engaging the inner face of said overhanging flanges, means normally pressing said plunger outwardly, substantially as described.

11. In a mechanism of the class described, the combination with a suitable casing of a body revolubly mounted therein, pockets carried by said body, plungers operable within said pockets, shafts carrying said plungers and projecting inwardly through the bottoms of said pockets, a cam carried by said casing, shafts engaging the same, all of said shafts being threaded upon their free ends, and elongated nuts connecting the plunger-shafts with the cam-contacting shafts, substantially as described.

12. In a mechanism of the class described, the combination with a suitable casing, of receptacles movably mounted therein, a cam carried by said casing, plungers operable within said receptacles, shafts carried by said plungers and projecting inwardly through the bottoms of said receptacles, and threaded on their inner ends, shafts engaging said cam, projecting outwardly and provided with threads upon their outer ends running in an opposite direction to that of the threads of the plunger-shafts, elongated nuts threaded onto and inclosing the contiguous ends of said shafts, and means for preventing rotation of said shafts, substantially as described.

In testimony whereof I hereunto affix my signature in presence of two witnesses.

JOHN McGINNITY.

Witnesses:
H. J. COWGILL,
D. O. BARNELL.